US008905441B2

(12) United States Patent
Barna (10) Patent No.: US 8,905,441 B2
(45) Date of Patent: Dec. 9, 2014

(54) DRAIN HUB

(75) Inventor: Kyle Steven Barna, Syracuse, NY (US)

(73) Assignee: Cooper Technologies Company, Houston, TX (US)

( * ) Notice: Subject to any disclaimer, the term of this patent is extended or adjusted under 35 U.S.C. 154(b) by 88 days.

(21) Appl. No.: 13/607,235

(22) Filed: Sep. 7, 2012

(65) Prior Publication Data

US 2014/0069711 A1     Mar. 13, 2014

(51) Int. Cl.
*F16L 27/00*     (2006.01)
(52) U.S. Cl.
USPC ..................................... 285/139.2; 285/139.1
(58) Field of Classification Search
CPC ............... F16L 5/02; F16L 5/10; F16L 25/01; F16L 25/02; F16L 25/025; F16L 25/023
USPC ........... 285/139.2, 123.12, 137.11, 139.1, 14, 285/13
See application file for complete search history.

(56) References Cited

U.S. PATENT DOCUMENTS

| | | | |
|---|---|---|---|
| 1,393,089 A * | 10/1921 | Hunter | 285/137.11 |
| 2,453,391 A | 11/1948 | Whittingham | |
| 3,584,900 A | 6/1971 | Lennon et al. | |
| 3,993,330 A | 11/1976 | Goransson | |
| 4,000,918 A | 1/1977 | Reker | |
| 4,686,328 A | 8/1987 | Ui et al. | |
| 5,408,706 A * | 4/1995 | Barnes | 4/507 |
| 7,494,157 B1 | 2/2009 | Kiely | |
| 7,703,813 B1 | 4/2010 | Kiely | |
| 7,857,358 B2 | 12/2010 | Rolland et al. | |

FOREIGN PATENT DOCUMENTS

JP          07231534          8/1995

* cited by examiner

*Primary Examiner* — Aaron Dunwoody
(74) *Attorney, Agent, or Firm* — King & Spalding LLP (57) ABSTRACT

A drain hub can include a housing, a base, and a damming device. The housing has a cavity that traverses its length and can include a top housing portion, a middle housing portion having at least one wall and a number of drainage apertures that traverse the wall, and a bottom housing portion. The base is rotatably disposed within the housing cavity and has a base cavity traversing its length. The base can include a top base portion having a number of slotted features disposed along a top surface. The base can also include a bottom base portion that extends beyond an aperture in the bottom housing portion. The damming device can be disposed within the housing cavity adjacent to the top base portion and the top housing portion, where the damming device has an elastomeric material and at least one aperture through which at least one conductor traverses.

20 Claims, 6 Drawing Sheets

DRAIN HUB

TECHNICAL FIELD

The present disclosure relates generally to drain fittings and more particularly to systems, methods, and devices for a drain hub that removes condensation from enclosures that contain electrical wiring.

BACKGROUND

Drain fittings and hubs are used to allow condensation to exit an enclosure. Condensation can easily be introduced in certain enclosures (e.g., conduit, junction box) that are not air-tight and/or water tight. Even when an enclosure is air-tight and/or water tight, condensation can still enter the enclosure through one or more carriers, such as conductors that traverse an aperture in an enclosure. For example, condensation can build in a conduit, resulting water can trickle along a conductor in the conduit, and the water is introduced into a junction box at the point where the conductor enters the junction box.

When electrical components (e.g., electrical wiring) are present inside the enclosure, removing the condensation can become very important. If condensation is not removed from such an enclosure, then corrosion and other problems can arise. The effect of such problems can include ground faults, short circuits, explosions, and other similar results that can affect equipment, infrastructure, and personnel.

At times, an enclosure must meet certain standards based on one or more of a number of factors, including the contents of the enclosure and the location where the enclosure is positioned. When an enclosure includes a drain fitting or hub, the drain fitting or hub cannot cause the enclosure to fail to meet the required standards for the enclosure.

SUMMARY

In general, in one aspect, the disclosure relates to a drain hub having a housing, a base, and a damming device. The housing can have a housing cavity traversing its length and include a top housing portion having a first inner perimeter. The housing can also include a middle housing portion having at least one wall and a number of drainage apertures that traverse the at least one wall, where the middle housing portion has a second inner perimeter, where the first inner perimeter is greater than the second inner perimeter. The housing can also include a bottom housing portion having a third inner perimeter, where the second inner perimeter is greater than the third inner perimeter. The base of the drain hub can be rotatably disposed within the housing cavity and have a base cavity traversing its length. The base can include a top base portion having a number of slotted features disposed along a top surface and having a first outer perimeter, where the first outer perimeter is slightly less than the second inner perimeter of the middle housing portion and slightly greater than the third inner perimeter of the bottom housing portion. The base can also include a bottom base portion that extends beyond an aperture in the bottom housing portion. The damming device can be disposed within the housing cavity adjacent to the top base portion and the top housing portion, where the damming device has an elastomeric material and at least one aperture through which at least one conductor traverses.

In another aspect, the disclosure can generally relate to a method for removing condensation from an enclosure that comprises a conductor. The method can include receiving the conductor through a damming device, and receiving condensation along the conductor on one side of the damming device. The method can also include collecting the condensation within a base member, and rotating the base member to align with a housing member. The method can further include draining the condensation through a number of apertures in the base member and the housing member.

These and other aspects, objects, features, and embodiments will be apparent from the following description and the appended claims.

BRIEF DESCRIPTION OF THE DRAWINGS

The drawings illustrate only exemplary embodiments and are therefore not to be considered limiting in scope, as the exemplary embodiments may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION

Exemplary embodiments of drain hubs will now be described in detail with reference to the accompanying figures. Like, but not necessarily the same or identical, elements in the various figures are denoted by like reference numerals for consistency. In the following detailed description of the exemplary embodiments, numerous specific details are set forth in order to provide a more thorough understanding of the disclosure herein. However, it will be apparent to one of ordinary skill in the art that the exemplary embodiments herein may be practiced without these specific details. In other instances, well-known features have not been described in detail to avoid unnecessarily complicating the description. Further, certain descriptions (e.g., top, bottom, side, end, interior, inside, inner, outer) are merely intended to help clarify aspects and are not meant to limit embodiments described herein.

In general, exemplary embodiments provide systems, methods, and devices for drain hubs. Specifically, exemplary embodiments provide for collecting and disposing of condensation within an enclosure so that the condensation does not accumulate on electrical wiring. As used herein, a drain hub can be an exemplary term used to describe a connector that drains on one side only. For example, if an exemplary drain hub is mechanically coupled to one type of enclosure (e.g., conduit) at one end and another type of enclosure (e.g., a junction box) at the other end, the drain hub only drains where the conduit couples to the drain nut or where the junction box couples to the drain hub.

Further, as used herein, a drain hub can also be an exemplary term used to describe a connector that drains on both sides. For example, if an exemplary drain hub is mechanically coupled to the same type of enclosure (e.g., conduit) at each end, the drain hub drains where both conduits couple to the drain hub.

One or more conductors traverse through the exemplary drain hub so that the drain hub can remove the condensation that accumulates on the one or more conductors. A conductor is a wire that has an insulating cover that surrounds the wire. The wire can be made of one or more of a number of electrically conductive materials, including but not limited to copper and aluminum. The wire of the conductor can be any of a number of sizes, such as 22 American wire gauge (AWG) or #18. The wire can have a substantially similar cross-sectional area along its length.

The insulating cover can be made of one or more of a number of electrically non-conductive materials, including but not limited to rubber, nylon, and polyurethane. The thickness of the insulating cover can be of any thickness and can be uniform along the length and cross-sectional perimeter of the wire. A conductor can be a single conductor, a number of single conductors, or one of a number of conductors within a cable. With multiple conductors, one conductor can be the same (e.g., size, material) or different than the other conductors.

An enclosure that couples to an exemplary drain nut can be one or more of a number of devices that enclose a conductor. Examples of an enclosure include, but are not limited to, a conduit (rigid or flexible), a junction box, a splice box, a motor control center, a breaker enclosure, a relay cabinet, and an instrumentation panel. The enclosure can be made of one or more of a number of materials, including but not limited to metal, rubber, and plastic.

In certain exemplary embodiments, an enclosure that is mechanically coupled to an exemplary drain nut is subject to meeting certain standards and/or requirements. For example, an enclosure that mechanically couples to an exemplary drain nut can be placed in one of a number of different environments where one or more standards must be met. Standard setting entities for such enclosures can include, but are not limited to, the National Electrical Manufactures Association (NEMA), the National Electric Code (NEC), the Institute of Electrical and Electronics Engineers (IEEE), and Underwriters' Laboratories (UL).

For example, the exemplary drain hub, when coupled to an enclosure, can allow an enclosure to meet is the NEMA 4X standard. In such a case, the enclosure is constructed to provide a degree of protection against, at least, corrosion, falling dirt, rain, sleet, snow, ice, windblown dust, splashing water, and hose-directed water. Thus, the drain hub that is mechanically coupled to such an enclosure must also meet these standards.

Another standard that the exemplary drain hub, when coupled to an enclosure, allows an enclosure to meet is the NEMA 3R standard. The NEMA 3R standard applies to enclosures for primarily outdoor use, where the enclosure provides protection against falling rain, sleet, and snow. Such an enclosure should also be undamaged by ice that forms on the enclosure. When used indoors, such an enclosure protects against dripping water. A NEMA 3R enclosure does not require a gasket sealing surface.

Yet another standard that the exemplary drain hub, when coupled to an enclosure, allows an enclosure to meet is the NEMA 6P standard. The NEMA 6P standard applies to enclosures for indoor or outdoor use where occasional prolonged submersion of the enclosure in a liquid is encountered. Corrosion protection is required for such an enclosure, and so such enclosures are usually made of stainless steel or plastic.

A user may be any person that interacts with an enclosure or equipment controlled by one or more components (e.g., motor, fan, relay, programmable logic controller) of the enclosure. Examples of a user may include, but are not limited to, an engineer, an electrician, an instrumentation and controls technician, a mechanic, an operator, a consultant, a contractor, and a manufacturer's representative.

Figure 1A:
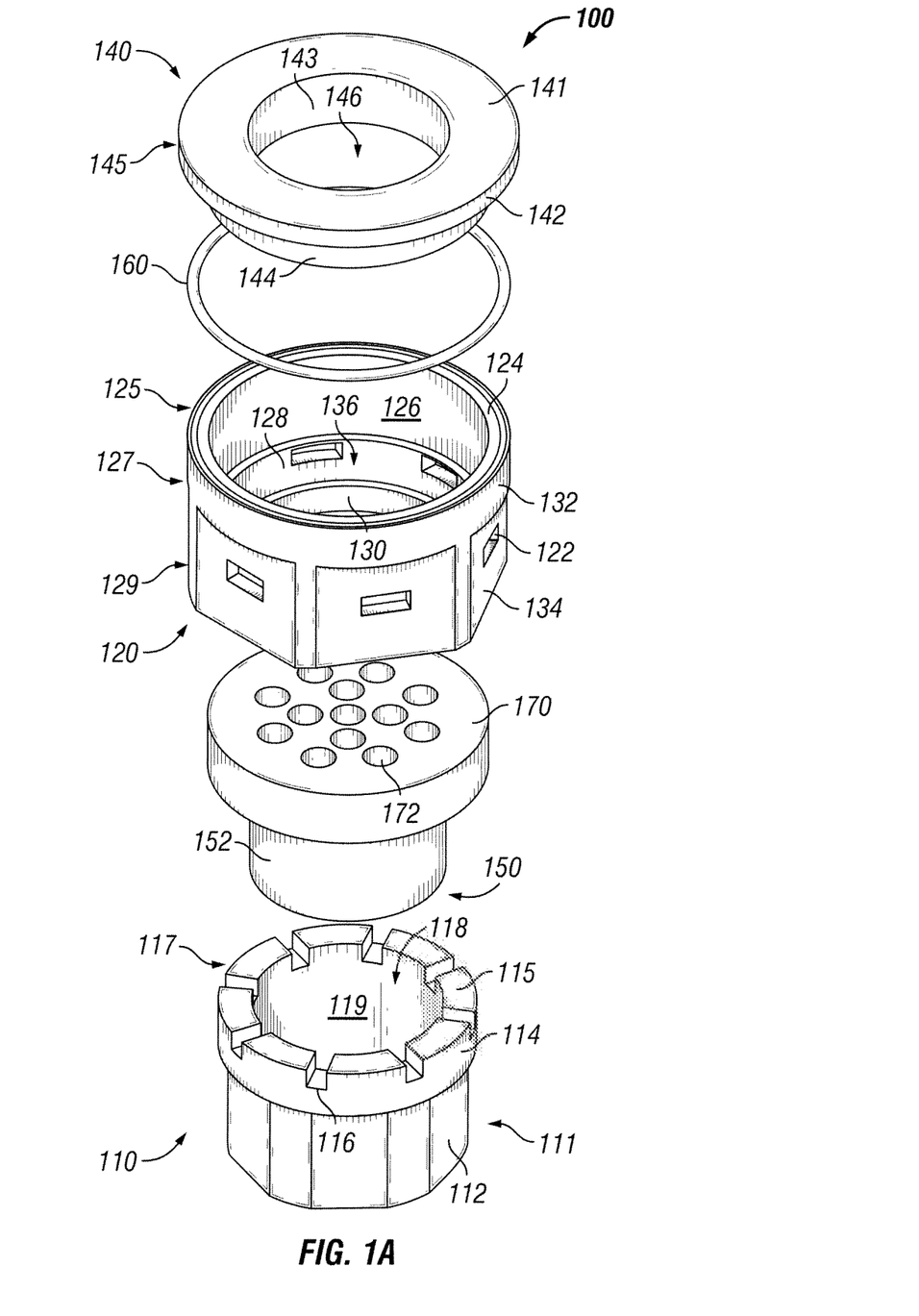
FIGS. 1A-1D show various views of an exemplary drain hub in accordance with certain exemplary embodiments.
Figure 1B:
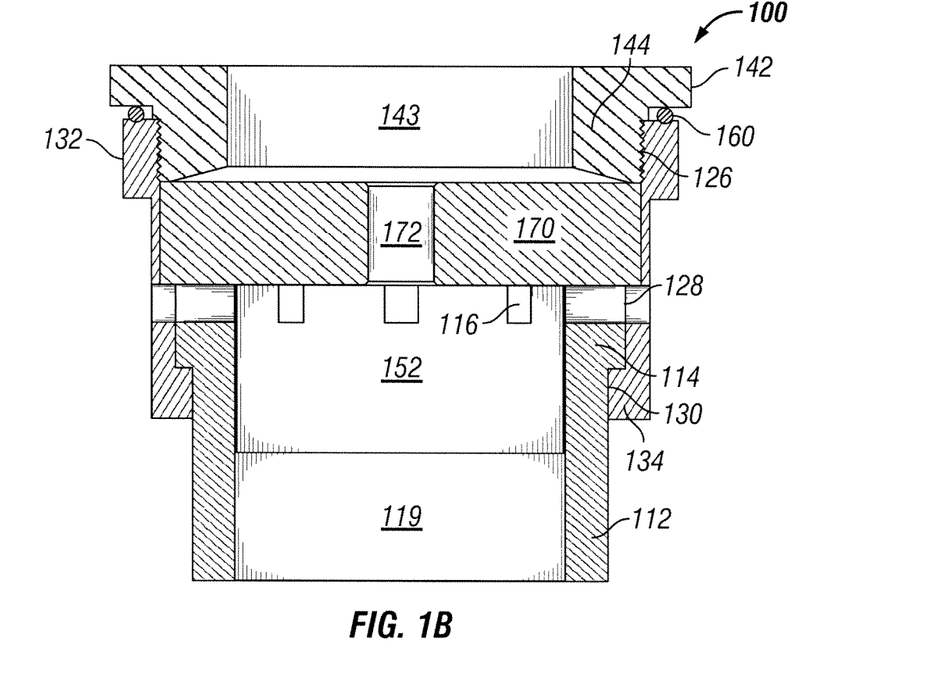
Figure 1C:
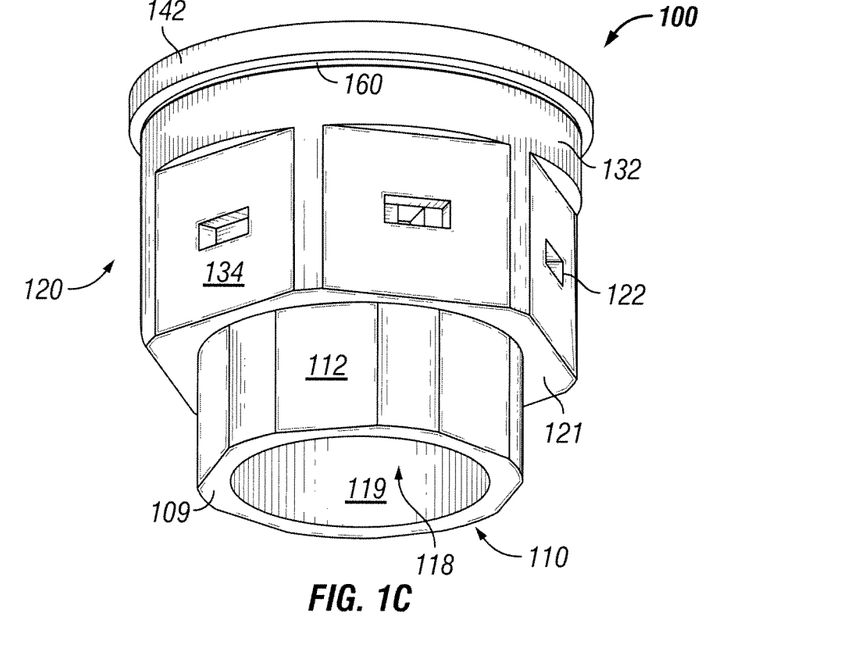
Figure 1D:
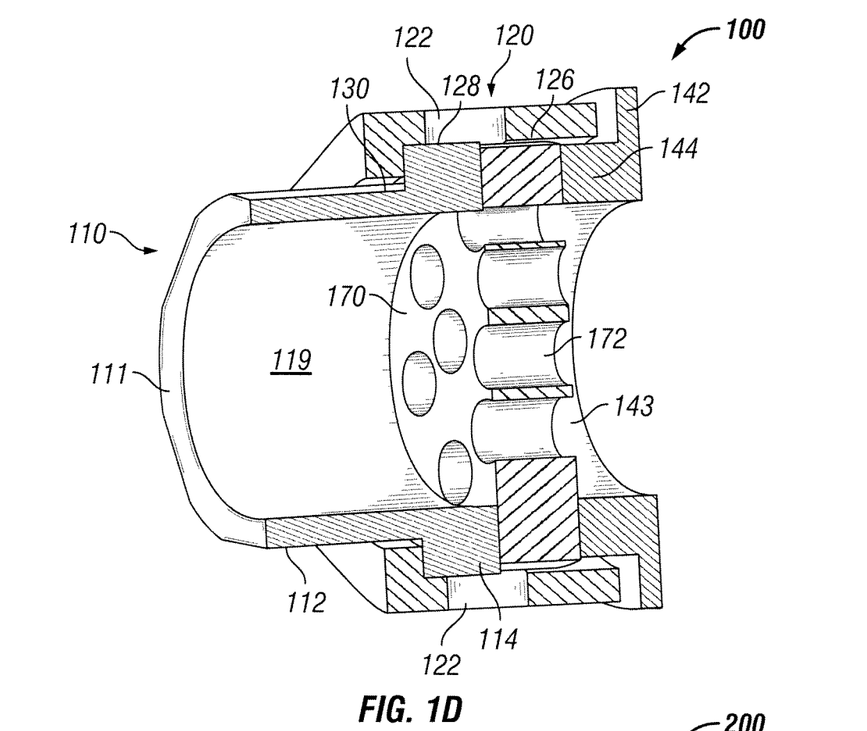

FIGS. 1A-1D depict various views of an exemplary drain hub 100 in accordance with certain exemplary embodiments. Specifically, FIG. 1A shows an exploded perspective view of a drain hub 100. FIG. 1B shows a cross-sectional side view of the drain hub 100. FIG. 1C shows a perspective side view of the drain hub 100. FIG. 1D shows a cross-sectional perspective view of the drain hub 100. In one or more embodiments, one or more of the components shown in FIGS. 1A-1D may be omitted, repeated, and/or substituted. Accordingly, embodiments of drain nuts should not be considered limited to the specific arrangements of components shown in FIGS. 1A-1D.

Referring to FIGS. 1A-1D, the exemplary drain hub 100 includes a base 110, a housing 120, a damming device 170, and, optionally, an inverted nut 140, a filter sleeve 150, and an insulating member 160. In certain exemplary embodiments, the base 110 has a top portion 117 and a bottom portion 111. The top portion 117 is thicker (extends further radially outward) than the bottom portion 111. The base 110 (also called a base member 110), including the top portion 117 and the bottom portion 111, are tubular. Specifically, the base 110 has a cavity 118 that runs along the length of the base 110. The cavity 118 of the base is defined by an inner surface of the base 110. The cross-sectional area of the base 110 can have one or more of a number of shapes, including but not limited to a circle, an oval, a rectangle, and a hexagon.

The inner surface 119 of the base 110 can be seamless between the top portion 117 and the bottom portion 111. In other words, the inner surface 119 of the base 110 can be uniform along the length of the base 110, so that only the outer surfaces of the top portion 117 and the bottom portion 111 differ. The inner surface 119 can be substantially vertical, as shown in FIGS. 1A-1D. Alternatively, the inner surface 119 can have some horizontal component along the length of the base 110. The inner surface 119 can be straight, angled, and/or curved along the length of the base 110. The inner surface 119 can be smooth and/or textured.

In certain exemplary embodiments, at least the upper part of the bottom portion 111 is positioned within a cavity 136 of the housing 120 (described below). The bottom portion 111 includes an outer surface 112 and has a thickness. The outer surface of the bottom portion 111 can be substantially vertical, as shown in FIGS. 1A-1D. Alternatively, the outer surface 112 of the bottom portion 111 can have some horizontal component along its length. The outer surface 112 of the bottom portion 111 can be straight, angled, and/or curved along its length. The outer surface 112 of the bottom portion 111 can be smooth and/or textured. For example, the outer surface 112 of the bottom portion 111 has a number of vertical planes (in this case, a total of 12 vertical planes), where each plane alternates between a wider plane and a narrower plane.

The top portion 117 is positioned within a cavity 136 of the housing 120, and the bottom portion 111 extends beyond the bottom portion 129 of the housing 120 (described below). The top portion 117 includes an outer surface 114 and has a thickness. The outer surface 114 of the top portion 117 can be substantially vertical, as shown in FIGS. 1A-1D. Alternatively, the outer surface 114 of the top portion 117 can have some horizontal component along its length. The outer surface 114 of the top portion 117 can be straight, angled, and/or curved along its length. The outer surface 114 of the top portion 117 can be smooth and/or textured. For example, the outer surface 114 of the top portion 117 is smooth and curved.

In addition, in certain exemplary embodiments, along the top surface 115 of the top portion 117, there are a number of slotted features 116 that originate at the top surface 115 and extend downward toward the bottom portion 111. There can be one or multiple slotted features 116 in the top portion 117. Each slotted feature 116 can have the same or different dimensions (e.g., width, depth, shapes) as the dimensions of the other slotted features 116. For example, in FIG. 1A, there are eight slotted features 116 disposed on the top portion 117, where each slotted feature 116 has substantially identical dimensions to each other. Specifically, each slotted feature 116 has two sides that extend vertically downward along the entire thickness of the wall of the top portion 117 to a point approximately half way along the height of the top portion 117. Where the two vertically extending sides for each slotted feature 116 stop, a substantially horizontal side joins them.

The top portion 117 and the bottom portion 111 can be separate pieces that are fixedly coupled to each other to form the base 110. Alternatively, the top portion 117 and the bottom portion 111 can be made as a single piece (as from a mold). In certain exemplary embodiments, the base 110 is water-proof and corrosion-proof. The base 110 (including the top portion 117 and the bottom portion 111) can be made of one or more of a number of materials, including but not limited to plastic, nylon, and stainless steel.

In certain exemplary embodiments, the cavity 118 of the base 110 can have one or more of a number of cross-sectional shapes. For example, the cross-sectional shape of the cavity 118 can be circular (as shown in FIG. 1A), oval, rectangular, hexagonal, or any other suitable shape. The cavity 118 of the base 110 can have dimensions (e.g., height, cross-sectional shape, perimeter) suitable to slidably receive an enclosure (e.g., a conduit). In such a case, the base 110 can freely rotate when slidably coupled to the enclosure. In certain exemplary embodiments, the shape of the cavity 118 of the base 110 is substantially similar to the shape of the enclosure (or portion (e.g., aperture in a wall of a junction box) of the enclosure) that is received by the base 110.

The exemplary damming device 170 has one or more holes (apertures) that traverse the height of the damming device 170. The damming device 170 allows one or more conductors to pass through the one or more holes 172. Each hole 172 provides a liquid-tight seal around the corresponding conductor. The seal 172 formed by the damming device 170 around the conductor prevents any liquid (e.g., condensation, water) from passing through the hole 172 along the conductor. The damming device 170 is positioned within a cavity 136 of the housing 120 (described below) and adjacent to the top portion 117 of the base 110. In certain exemplary embodiments, the damming device 170 does not physically contact the top portion 117 of the base 110.

The exemplary damming device 170 described herein can be made of a flexible elastomeric material. Examples of such flexible elastomeric material include, but are not limited to, synthetic rubbers produced by polymerization of chloroprene, such as neoprene, polychloroprene, urethane, and silicone. In addition, or in the alternative, the flexible elastomeric material can include a butyl compound. The damming device 170 can be made as a single piece (e.g., made from a single mold) or as multiple pieces that are mechanically coupled together. In the latter case, the multiple pieces can be mechanically coupled using one or more of a number of methods, including but not limited to epoxy, melting, fusion, a fastening device, and a clamping device.

Each hole 172 of the damming device 170 can be cylindrical or conical (i.e., circular when viewed from a horizontal cross section). Alternatively, or in addition, the hole 170 can have one or more other shapes, viewed in two or three dimensions. For example, one or more holes 172 of the damming device 170 may have one shape (e.g., cube), while one or more other holes 172 of the damming device 170 can have another shape (e.g., cylinder). Examples of such shapes, when viewed in a two dimensional space, include but are not limited to a circle, an ellipse, a square, a rectangle, a hexagon, an octagon, and five-point star.

In certain exemplary embodiments, the walls of the hole 172 are conical (tapered) to channel the conductor more easily toward a designated area. When the holes 172 are circular, each hole 172 can be defined in terms of one or more radii. Similarly, the holes 172 can be defined by one or more other terms appropriate for the shape of the holes 172. For example, while a circular hole 172 is described below with respect to a radius, the circular hole 172 may also be described with respect to one or more other terms, including but not limited to a diameter, a circumference, a volume, and an area. Similarly, holes 172 having other shapes can be described using one or more terms appropriate to that shape. The junction at the top or bottom of a hole 172 with the body of the damming device 170 can be formed as a pointed edge or a rounded edge.

If there is no conductor that traverses a hole 172 in the damming device 170, then the hole 172 can remain closed, preventing any liquid from traversing the hole 172. When a conductor is inserted through a hole 172, the hole 172 is opened to allow the conductor to pass therethrough. In addition, the hole 172 closes over the conductor, creating a liquid-tight barrier to prevent liquid from traversing the hole 172 along the conductor.

Optionally, in certain exemplary embodiments, a filter sleeve 150 is coupled to or located adjacent to a bottom surface of the damming device 170. The filter sleeve 150 can include a filter sleeve wall 152 having a length that extends downward from the bottom portion of the damming device 170. The filter sleeve wall 152 can have a thickness and form an inner and outer perimeter. In certain exemplary embodiments, the filter sleeve 150 fits within an opening of an enclosure (e.g., fits inside of a conduit). In such a case, the filter sleeve wall 152 has an outer perimeter that is less than an inner perimeter of the enclosure. Alternatively, the filter sleeve 150 can have an enclosure slide within the cavity formed by the filter sleeve wall 152. In such a case, the filter sleeve wall 152 has an inner perimeter that is greater than an outer perimeter of the enclosure.

The filter sleeve wall 152 can be made of a permeable or porous material that allows liquids (e.g., water) to pass therethrough while preventing solids (e.g., dirt, rocks) from passing therethrough. Specifically, as condensation builds on the conductor that passes through the enclosure and drains toward the drain hub 100, some debris (e.g., dirt, rocks) can also be drained toward the drain hub 100. In such a case, the debris may be large enough to block some or all of the slotted features 116 in the base 110. As a result, the condensation collected by the drain hub 100 may not be able to drain properly. The filter sleeve wall 152 can prevent such blockage of the slotted features 116 in the base 110 from occurring.

The filter sleeve wall 152 can form a mesh. The holes of the mesh can be substantially the same or different than other holes of the mesh. The size of the holes can be based on the size of the debris that the filter sleeve 150 is designed to stop. The filter sleeve wall 152 can be made from one or more of a number of materials, including but not limited to nylon, metal, and rubber.

In certain exemplary embodiments, the housing 120 (also called a housing member 120) of the drain hub 100 is rotatably coupled to the base 110, fixedly coupled to the damming device 170, and, in some cases, removably coupled to the inverted nut 140. The housing can include multiple portions. For example, as shown in FIG. 1A, the housing 120 can have three portions. Specifically, the housing 120 can have a top portion 125, a middle portion 127, and a bottom portion 129.

The various portions of the housing 120 are defined along the inner surfaces. Here, the top portion 125 has a top inner surface 126, the middle portion 127 has a middle inner surface 128, and the bottom portion 129 has a bottom inner surface 130. Each inner surface of the housing 120 forms a perimeter for that respective portion. In this example, the middle inner surface 128 of the middle portion 127 forms a larger perimeter than the perimeter formed by the bottom inner surface 130 of the bottom portion 129, and the top inner surface 126 of the top portion 125 forms a larger perimeter than the perimeter formed by the middle inner surface 128 of the middle portion 127.

In certain exemplary embodiments, the perimeter of the top inner surface 126 of the top portion 125 is slightly larger than the perimeter of the damming device 170. In addition, the perimeter of the middle inner surface 128 of the middle portion 127 can be slightly smaller than the perimeter of the damming device 170. In such a case, the damming device 170, when positioned within the cavity 136 of the housing 120, sits on a shelf or ledge created between the middle portion 127 and the top portion 125 by the middle inner surface 128 and the top inner surface 126.

The housing 120, including the top portion 125, the middle portion 127, and the bottom portion 129, are tubular. Specifically, the housing 120 has a cavity 136 that runs along the length of the housing 120 (and thus also along the length of each of the sections of the housing 120). The cavity 136 of the base is defined by an inner surface of the housing 120. The cross-sectional area of the housing 120 can have one or more of a number of shapes, including but not limited to a circle, an oval, a rectangle, and a hexagon. Each inner surface of the housing 120 can be substantially vertical, as shown in FIGS. 1A-1C. Alternatively, each inner surface of the housing 120 can have some horizontal component along the length of the housing 120. Each inner surface of the housing 120 can be straight (as shown in FIG. 1A), angled, and/or curved along the length of the housing 120.

Each inner surface of the housing 120 can be smooth and/or textured. For example, the top inner surface 126 of the top portion 125 can have one or more features (e.g., threads) that are used to mechanically couple the housing 120 to some other component (e.g., the inverted nut 140) and/or an enclosure. In addition, or in the alternative, the outer surface of the housing 120 can include one or more features that allow the housing 120 to mechanically couple the housing 120 to one or more other components. In any case, such features allow the housing 120 to mechanically couple to complementary features of the other component.

As described above, at least the upper part of the bottom portion 111 of the base 110 is positioned within the cavity 136 of the housing 120. Specifically, the shelf or ledge created where the top portion 117 and the bottom portion 111 of the base 110 meet sits atop the shelf or ledge created between the middle portion 127 and the bottom portion 129 by the middle inner surface 128 and the bottom inner surface 130. In such a case, the outer perimeter of the top portion 117 of the base 110 is slightly smaller than the perimeter of the middle inner surface 128 and slightly larger than the perimeter of the bottom inner surface 130. In addition, the perimeter of the bottom portion 111 of the base 110 is slightly larger than the perimeter of the bottom inner surface 130. This allows the base 110 to slide within the cavity 136 of the housing 120 until the top portion 117 rests against the shelf or ledge created between the middle portion 127 and the bottom portion 129 by the middle inner surface 128 and the bottom inner surface 130. In certain exemplary embodiments, the height (length) of the top portion 117 of the base 110 is substantially the same or slightly less than the height of the middle portion 127 of the housing 120. In the latter case, the base 110 can freely rotate while coupled to the housing 120.

The outer surface of the housing 120 can be uniform along its length (between the top portion 125, the middle portion 127, and the bottom portion 129). Alternatively, as shown in FIG. 1A, the outer surface of the housing can include one or more portions. For example, FIG. 1A shows that the outer surface includes lower portion 134 that includes six flat surfaces of substantially equal dimensions to create a hexagon. The height (length) of these flat surfaces of the lower portion 134 is approximately equal to the height of half of the top portion 125, all of the middle portion 127, and all of the bottom portion 129. The outer surface of the housing 120 of FIG. 1A also includes a top portion 132 that is substantially smooth, like the top middle surface 126. The height of the top portion 132 of the outer surface is approximately equal to half the height of the top portion 125.

The outer surface of the housing 120 can be substantially vertical, as shown in FIGS. 1A-1C. Alternatively, the outer surface of the housing 120 can have some horizontal component along the length of the housing 120. The outer surface of the housing 120 can be straight, angled, and/or curved along the length of the housing 120. The outer surface of the housing 120 can be smooth and/or textured. In addition, in certain exemplary embodiments, a number of drainage apertures 122 traverse the wall of the middle portion 127 of the housing 120. There can be one or multiple drainage apertures 122 in the middle portion 127. Each drainage aperture 122 can have the same or different dimensions (e.g., width, depth, shapes) as the dimensions of the other drainage apertures 122. For example, in FIG. 1A, there are six drainage apertures 122 (one for each flat surface of the lower portion 134 on the outer surface of the housing 120) disposed on the middle portion 127, where each drainage aperture 122 has substantially identical dimensions to each other. Specifically, each drainage aperture 122 is rectangular in shape and traverses then entire thickness of the wall of the middle portion 127.

The top portion 125, the middle portion 127, and the bottom portion 129 can be separate pieces that are fixedly coupled to each other to form the housing 120. Alternatively, the top portion 125, the middle portion 127, and the bottom portion 129 can be made as a single piece (as from a mold). In certain exemplary embodiments, the housing 120 is waterproof and corrosion-proof. The housing 120 (including the top portion 125, the middle portion 127, and the bottom portion 129) can be made of one or more of a number of materials, including but not limited to plastic, nylon, and stainless steel.

In certain exemplary embodiments, the top side of the top portion 125 of the housing 120 includes one or more features 124 for receiving an optional insulating member 160. The insulating member 160 can be any device that is disposed between the housing 120 and another component (e.g., the inverted nut 140) and/or an enclosure. The insulating member 160 can be used to create a seal between the housing 120 and another component (e.g., the inverted nut 140) and/or an enclosure. Such a seal can act as a barrier to prevent, or greatly reduce, dust, water, and/or other contaminants from entering the cavity 136 of the housing 120.

Examples of the insulating component 160 can include, but are not limited to, a gasket, an o-ring, and silicon gel. The insulating component 160 can be disposed within the feature 124 of the housing 120. For example, if the feature 124 is a channel, then the insulating component 160 can be an o-ring that snugly fits within the channel. The insulating component 160 can be made of a compressible material. The insulating component 160 can be made from one or more of a number of materials, including but not limited to rubber, nylon, metal, and silicon.

In certain exemplary embodiments, the feature 124 on the top side of the top portion 125 of the housing 120 receives the insulating member 160. Examples of the feature 124 can include, but are not limited to, a channel, a ridge, and texture that is disposed on the top side of the top portion 125. The feature 124 can be integral with the housing 120 or mechanically coupled to the housing 120.

In certain optional exemplary embodiments, the optional inverted nut 140 mechanically couples to the housing 120. The inverted nut 140 can include a mating portion 144 for mechanically coupling the inverted nut 140 to the housing 120. For example, the mating portion 144 of the inverted nut 140 can have threads that mate with corresponding threads on the top inner surface 126 of the top portion 125 to threadably couple inverted nut 140 to the housing 120. In such a case, the insulating component 160 may be compressed between the inverted nut 140 and the housing 120 when the inverted nut 140 is coupled to the housing 120.

Figure 2:
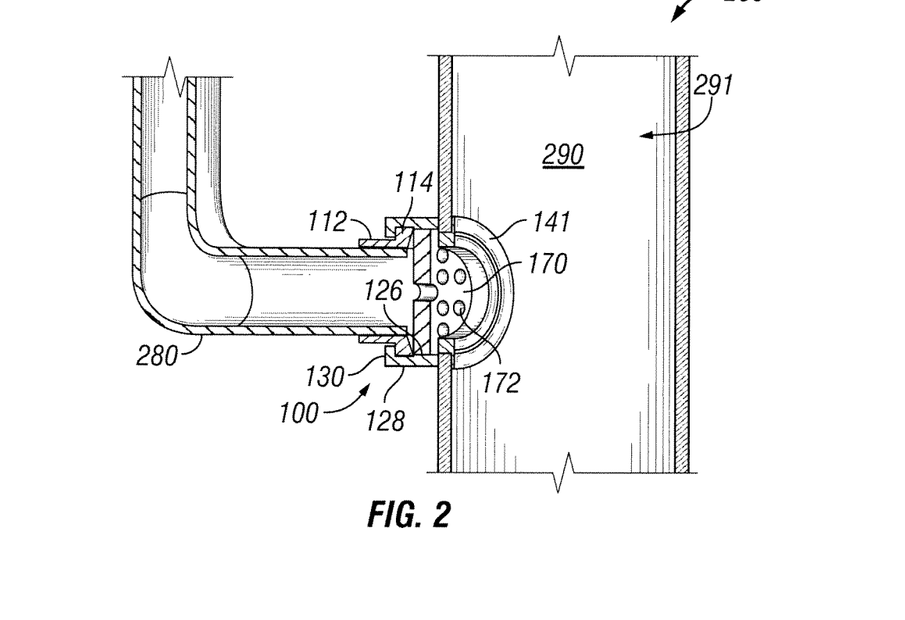
FIG. 2 shows a cross-sectional perspective view of an enclosure system using an exemplary drain hub in accordance with certain exemplary embodiments.

The inverted nut can also include a flange 145, located above the mating portion 144. The flange 145 can be used to compress the insulating component 160 and/or secure the drain hub 100 to an enclosure (e.g., a junction box). An example of this is shown in FIG. 2 below. In such a case, the outer perimeter of the mating portion 144 is slightly smaller than an aperture in the enclosure through which the mating portion 144 traverses.

The outer edge 142 of the flange 145 may substantially align with the top portion 132 of the outer surface of the housing 120. The outer edge 142 of the flange 145 may include one or more of a number of features to aid in coupling and/or decoupling the inverted nut 140 to the housing 120. Such features may include, but are not limited to, one or more flat edges, one or more slots, and a textured finish.

The top surface 141 of the flange 145 extends from the inner surface 143 to the outer edge 142 around some or all of the inverted nut 140. The top surface 141 of the flange 145 can be flat and smooth. In addition, or in the alternative, the top surface 141 of the flange 145 can include one or more of a number of features, including but not limited to a curvature, texture, an angled segment, and a channel.

The inverted nut 140 can also have an inner surface 143 that forms a cavity 146 that traverses the height (length) of the inverted nut 140. In certain exemplary embodiments, the perimeter of the inner surface 143 is large enough to allow all of the conductors that pass through the damming device 170 to traverse therethrough. The inner surface 143 of the inverted nut 140 can be seamless along its length. The inner surface 143 can be substantially vertical, as shown in FIGS. 1A-1D. Alternatively, the inner surface 143 can have some horizontal component along the length of the inverted nut 140. The inner surface 143 can be straight, angled, and/or curved along the length of the inverted nut 140. The inner surface 143 can be smooth (as shown in FIGS. 1A-1D) and/or textured.

The mating portion 144 and the flange 145 of the inverted nut 140 can be separate pieces that are fixedly coupled to each other to form the inverted nut 140. Alternatively, the mating portion 144 and the flange 145 can be made as a single piece (as from a mold). In certain exemplary embodiments, the inverted nut 140 is water-proof and corrosion-proof. The inverted nut 140 (including the mating portion 144 and the flange 145) can be made of one or more of a number of materials, including but not limited to plastic, nylon, and stainless steel.

FIG. 2 shows a cross-sectional perspective view of an enclosure system 200 using an exemplary drain hub 100 in accordance with certain exemplary embodiments. In one or more embodiments, one or more of the components shown in FIG. 2 may be omitted, repeated, and/or substituted. Accordingly, embodiments of drain hubs should not be considered limited to the specific arrangements of components shown in FIG. 2.

Referring now to FIGS. 1A-1D and 2, the drain hub 100 of the enclosure system 200 of FIG. 2 is substantially the same as the drain hub 100 described above with respect to FIGS. 1A-1D. In this case, the drain hub 100 is mechanically coupled to two different enclosures. Specifically, the base 110 is mechanically coupled to a conduit 280, while the inverted nut 140 is threadably coupled to the housing 120 and mechanically couples the drain hub 100 to a junction box 291.

In certain exemplary embodiments, the conduit 280 is inserted inside the cavity 118 of the base 110. The conduit 280 can be coupled to the base 110 in one or more of a number of ways, including but not limited to fixedly, slidably, and rotatably. If the conduit 280 is fixedly coupled to the base 110, then the base 110 may not be able to freely rotate. In such a case, the base 110 may have a larger number of slotted features and/or the housing 120 may have a larger number of drainage apertures 122. If the conduit 280 is fixedly coupled to the base 110, then one or more of a number of coupling methods can be used, including but not limited to epoxy, heat shrink tubing, compression fittings, mating threads, and fastening devices.

If the conduit 280 is not fixedly coupled to the base 110, then the base 110 can be freely rotatable. In such a case, one or more bracing devices (e.g., a bracket that couples to the conduit 280 at one end and the wall 290 of the junction box 291 at the other end) can be used to hold the conduit 280 in place relative to the base 110.

As shown in FIG. 2, the inverted nut 140 is mechanically coupled to one side (e.g., the inside surface) of the wall 290 of the junction box 291 as well as the housing 120. In addition, the top portion 125 of the housing 120 is mechanically coupled to the opposite side (e.g., the outside surface) of the wall 290 of the junction box 291. In such a case, the inverted nut 140 and/or the top portion 125 of the housing 120 traverses an aperture in the wall 290 of the junction box 291.

For the enclosure system 200 of FIG. 2, condensation can accumulate inside the conduit 280 and flow toward the junction box 291. Without the exemplary drain hub 100, the condensation will flow into the enclosure, creating a risk of an electrical condition (e.g., short circuit, corrosion, arcing, ground fault) caused by the condensation. By inserting the exemplary drain hub 100 in the enclosure system 200, condensation is blocked from entering the junction box 291 from the conduit 280. Instead, the drain hub 100 collects and expels the condensation outside the junction box 291.

Figure 3A:
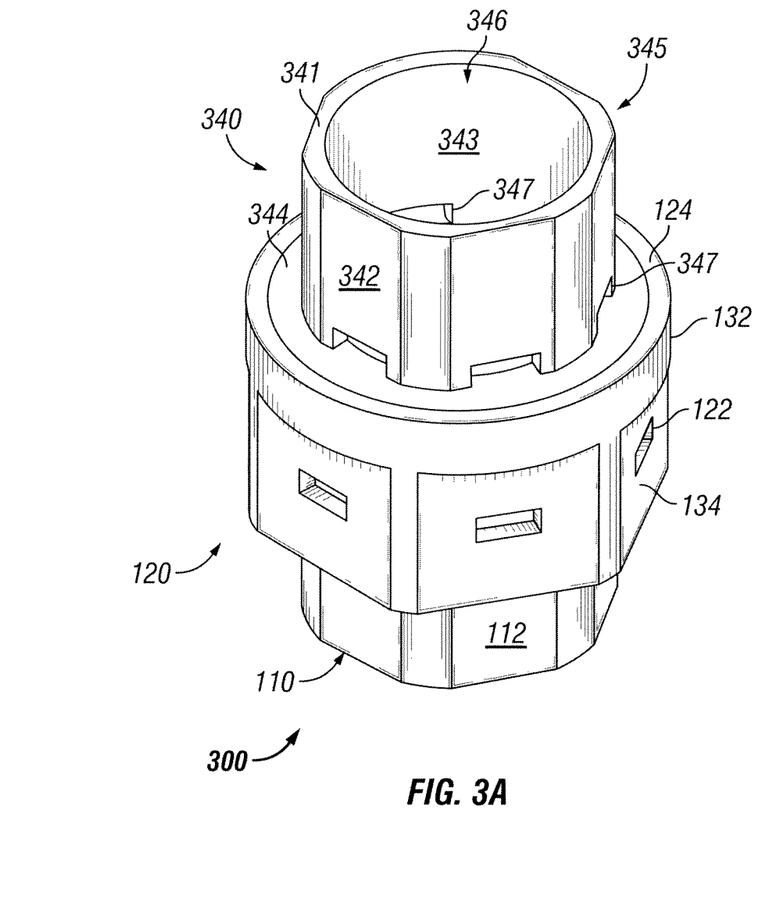
FIGS. 3A and 3B show various views of another exemplary drain hub in accordance with certain exemplary embodiments.
Figure 3B:
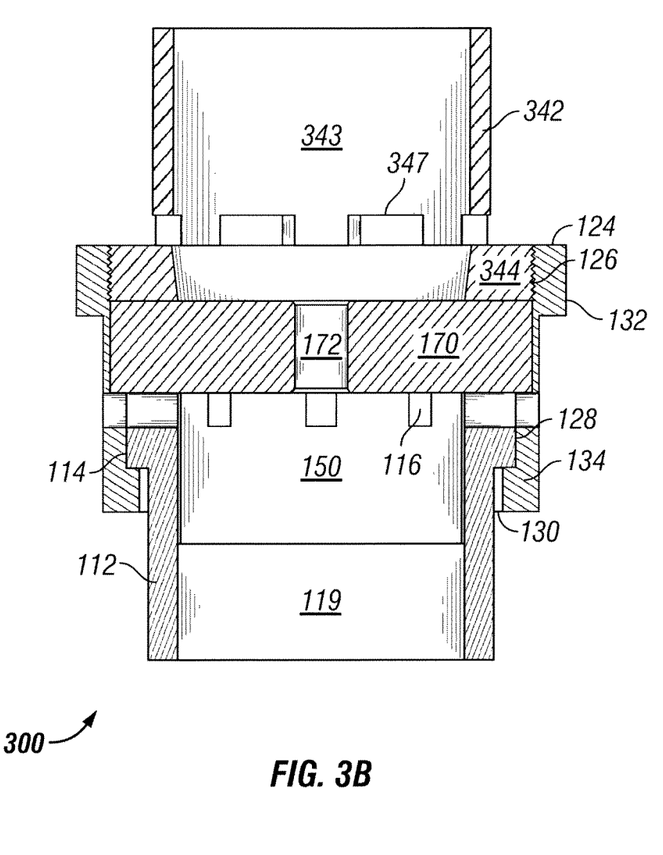

FIGS. 3A and 3B show various views of an alternative drain hub 300 in accordance with certain exemplary embodiments. Except as described below, the components of the drain hub 300 are substantially similar to the corresponding components described above with respect to FIGS. 1A-2.

Referring to FIGS. 1-3B, the inverted nut 140 described above with respect to FIGS. 1A-1D is now replaced in FIGS. 3A and 3B with an additional base 340. The additional base 340 includes a mating portion 344 and a receiving portion 345. The additional base 340 couples to an enclosure (e.g., a different conduit) that requires a different coupling feature than an inverted nut.

In certain exemplary embodiments, the mating portion 344 is a flat, disk-shaped piece having a shape (when viewed from a bottom view) that is substantially similar to the shape (when viewed from a top view) of the housing 120. The top surface of the mating portion 344 is, at least in part, made of a solid material (e.g., metal, rubber) that prevents water from flowing therethrough. In certain exemplary embodiments, a middle portion of the mating portion 344 includes at least one aperture (not shown) that is at least large enough to allow the conductors to pass therethrough. In such a case, the aperture extends at least a portion of the cavity 346 to the top side of the damming device 170. The mating portion 344 can include a mating surface (not shown) along the outer perimeter (on the side) that allows the additional base 340 to mechanically couple to the housing 120.

The mating surface can include one or more of a number of features (e.g., threads, slots, fasteners, fastener receivers) that mechanically couple to corresponding features of the housing 120, such as the top portion 125 of the housing 120. For example, the outer perimeter of the mating portion 344 can be threaded, which allows the mating portion 344 to be threadably coupled to the housing 120 having corresponding threads along the top inner surface 126 of the top portion 125. The mating portion 344 can have other shapes and/or sizes and still mechanically couple to the housing 120.

In certain exemplary embodiments, the receiving portion 345 is disposed on the top of the mating portion 344. The receiving portion 345 of the additional base 340 receives the enclosure, collects condensation from inside the enclosure, and removes the condensation. The receiving portion 345 is tubular. Specifically, the receiving portion 345 has a cavity 346 that runs along the length of the receiving portion 345. The cavity 346 of the receiving portion 345 is defined by an inner surface 343 of the receiving portion 345. The cross-sectional area of the receiving portion 345 can have one or more of a number of shapes, including but not limited to a circle, an oval, a rectangle, and a hexagon.

The inner surface 343 of the receiving portion 345 can be seamless along its height (length). The inner surface 343 can be substantially vertical. Alternatively, the inner surface 343 can have some horizontal component along the length of the receiving portion 345. The inner surface 343 can be straight, angled, and/or curved along the length of the receiving portion 345. The inner surface 343 can be smooth and/or textured.

In certain exemplary embodiments, the receiving portion 345 also includes an outer surface 342 and forms a thickness with the inner surface 343. The outer surface 342 of the receiving portion 345 can be substantially vertical. Alternatively, the outer surface 342 can have some horizontal component along its length. The outer surface 342 can be straight, angled, and/or curved along its length. The outer surface 342 of the receiving portion 345 can be smooth and/or textured. For example, the outer surface 342 of the receiving portion 345 has a number of vertical planes (in this case, a total of 12 vertical planes), where each plane alternates between a wider plane and a narrower plane.

In addition, in certain exemplary embodiments, along the bottom of the receiving portion 345 (i.e., where the receiving portion 345 couples to the mating portion 344), there are a number of slotted features 347 that originate at the bottom of the receiving portion 345 and extend upward away from the mating portion 344 and toward the top side 341 of the receiving portion 345. There can be one or multiple slotted features 347 in the bottom of the receiving portion 345. Each slotted feature 347 can have the same or different dimensions (e.g., width, depth, shapes) as the dimensions of the other slotted features 347. For example, in FIG. 3A, there are six slotted features 347 disposed on the bottom of the receiving portion 345, where each slotted feature 347 has substantially identical dimensions to each other. Specifically, each slotted feature 347 has two sides that extend vertically upward along the entire thickness of the wall of the bottom of the receiving portion 345 to a point approximately 10% up the height of the bottom of the receiving portion 345. Where the two vertically extending sides for each slotted feature 347 stop, a substantially horizontal side joins them.

The receiving portion 345 and the mating portion 344 can be separate pieces that are fixedly coupled to each other to form the additional base 340. Alternatively, the receiving portion 345 and the mating portion 344 can be made as a single piece (as from a mold). In certain exemplary embodiments, the additional base 340 is water-proof and corrosion-proof. The additional base 340 (including the receiving portion 345 and the mating portion 344) can be made of one or more of a number of materials, including but not limited to plastic, nylon, and stainless steel.

In certain exemplary embodiments, the cavity 346 of the receiving portion 345 can have one or more of a number of cross-sectional shapes. For example, the cross-sectional shape of the cavity 346 can be circular (as shown in FIG. 3A), oval, rectangular, hexagonal, or any other suitable shape. The cavity 346 of the receiving portion 345 can have dimensions (e.g., height, cross-sectional shape, perimeter) suitable to slidably receive an enclosure (e.g., a conduit). In such a case, the receiving portion 345 can freely rotate when slidably coupled to the enclosure. Alternatively, the receiving portion 345 can be fixedly coupled to the mating portion, preventing the receiving portion from freely rotating. In certain exemplary embodiments, the shape of the cavity 346 of the receiving portion 345 is substantially similar to the shape of the enclosure (or portion (e.g., aperture in a wall of a junction box) of the enclosure) that is received by the receiving portion 345.

Figure 4A:
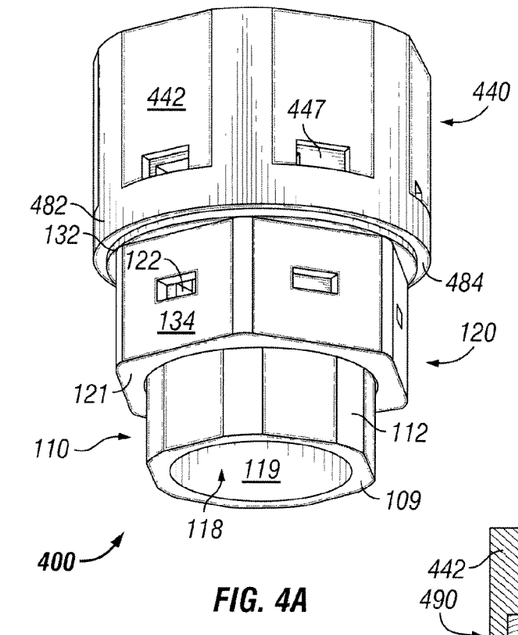
FIGS. 4A and 4B show various views of yet another exemplary drain hub in accordance with certain exemplary embodiments.
Figure 4B:
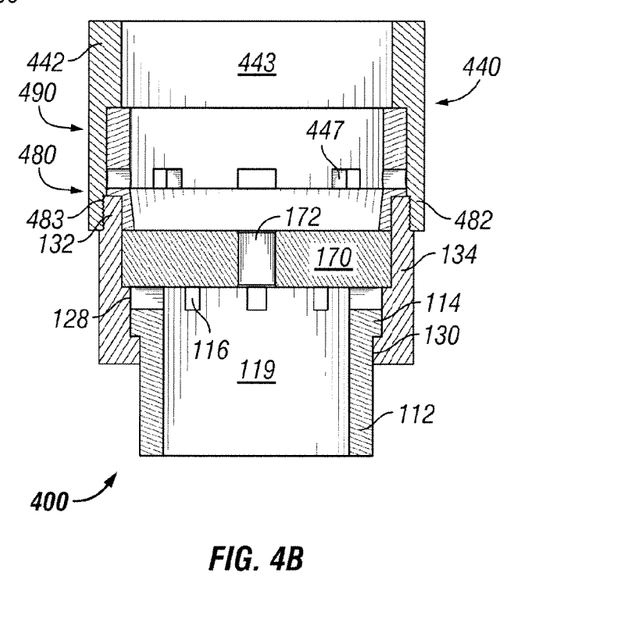

FIGS. 4A and 4B show various views of yet another alternative drain hub 400 in accordance with certain exemplary embodiments. Except as described below, the components of the drain hub 400 are substantially similar to the corresponding components described above with respect to the drain hub 300 of FIGS. 3A and 3B. Specifically, the differences between the additional base 440 of FIGS. 4A and 4B and the additional base 340 of FIGS. 3A and 3B are described below.

Referring to FIGS. 1-4B, the additional base 440 of FIGS. 4A and 4B includes a lower portion 480 and an upper portion 490. The upper portion 480 is substantially similar to the receiving portion 345. In certain exemplary embodiments, the size of the inner perimeter of the upper portion 480 is larger than the inner perimeter of the receiving portion 345. In such a case, the cavity of the upper portion 480 can receive a larger enclosure or couple to a larger aperture in an enclosure.

The lower portion 480 of the additional base 440 is somewhat similar to the mating portion 344 of FIGS. 3A and 3B in that the top end of the lower portion 480 is mechanically coupled to the upper portion 490 and in that the bottom end of the lower portion 480 is mechanically coupled to the housing 120, such as the top portion 125 of the housing 120. However, the manner in which the lower portion 480 couples to the housing 120 may differ from how the mating portion 344 couples to the housing 120.

Specifically, as shown in FIGS. 4A and 4B, the top outer surface, rather than the top inner surface 126, of the top portion 125 of the housing 120 has mating features for receiving complementary mating features of the lower portion 480. Similarly, the complementary mating features of the lower portion 480 are disposed on an inner surface 483 of the lower portion 480 rather than on the outer surface of the lower portion 480. For example, the top outer surface of the top portion 125 of the housing 120 may have mating threads that threadably couple to complementary mating threads disposed on the inner surface 483 of the lower portion 480.

The lower portion 480 also has an outer surface 482. The outer surface 482 shown in FIGS. 4A and 4B is smooth, but can have any other texture, curvature, shape, and/or other characteristics. The top end of the outer surface 482 abuts against the bottom side of the slotted features 447 of the upper portion 480.

The exemplary drain hubs described herein can be used in one of a number of locations and/or environments. For example, the drain hubs that receive (are mechanically coupled to) a conduit at both ends (e.g., drain hub 300, drain hub 400) can be used, for example, in a cable trough, in conduit, or buried underground. In such a case, the drain hub can be a coupler or reducer. Further, such drain hubs can be used in hazardous areas, outdoors, or in any other type of environment. When a drain hub 400 receives a conduit at both ends, the drain hub 400 can be positioned at a horizontally low point so that gravity helps improve the effectiveness of the drain hub 400 in collecting and removing the condensation that accumulates inside the conduits. In such a case, when the conduits and drain hub 400 are buried underground, the drain hub 400 acts as a French drain.

In certain exemplary embodiments, to further aid in the effectiveness of a drain hub (e.g., drain hub 300, drain hub 400) in collecting and removing condensation, each fitting (e.g., the additional base 440 mechanically coupling to the housing 120) can have a pitch of some degree. For example, when viewed in terms of an axis that runs along the length of the housing 120, the axis that runs along the length of the additional base 440 may form an acute angle (e.g., 5 degrees) rather than an angle of zero degrees (in line).

Figure 5:
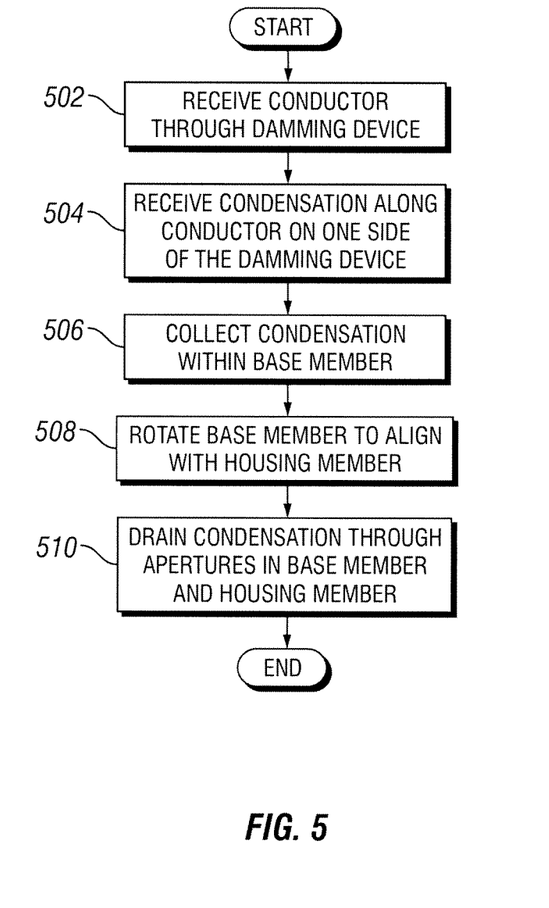
FIG. 5 shows a flow chart of an exemplary method for removing condensation from an enclosure that includes a conductor in accordance with certain exemplary embodiments.

FIG. 5 is a flowchart of an exemplary method 500 for removing condensation from an enclosure that includes a conductor in accordance with certain exemplary embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the exemplary embodiments, one or more of the steps described below may be omitted, repeated, and/or performed in a different order. In addition, a person of ordinary skill in the art will appreciate that additional steps not shown in FIG. 5, may be included in performing this method. Accordingly, the specific arrangement of steps should not be construed as limiting the scope.

Now referring to FIGS. 1-5, the exemplary method 500 begins at the START step and proceeds to step 502, where a conductor is received through a damming device 170. In certain exemplary embodiments, the damming device 170 is disposed within a drain hub 100. The conductor traverses a hole 172 in the damming device 170. The damming device 172 creates a liquid-tight seal around the conductor when the conductor traverses the hole 172. The conductor can be positioned inside of an enclosure (e.g., conduit 280, junction box 291).

In step 504, condensation is received along the conductor on one side of the damming device 170. In certain exemplary embodiments, the condensation builds inside the enclosure, accumulates on the conductor within the enclosure, and follows along the conductor toward the drain hub 100. In certain exemplary embodiments, the drain hub 100 is placed in a location relative to the enclosure that puts the drain hub 100 at a low point to help in collecting the condensation. When the condensation enters the drain hub 100 along the conductor, the damming device 170 prevents the condensation from traveling further along the conductor.

In step 506, the condensation is collected within a base member 110. When the damming device 170 prevents the condensation from traveling further along the conductor, the condensation collects on the one side of the damming device 170. In certain exemplary embodiments, the damming device 170 is positioned adjacent to the base member 110 of the drain hub 100.

In step 508, the base member 110 is rotated to align with a housing member 120. In certain exemplary embodiments, the housing member 120 is part of the drain hub 100. Specifically, the base member 110 is positioned inside a cavity 136 of the housing member 120. Further, the base member 110 can rotate within the housing member 120. In certain exemplary embodiments, the base member 110 self-rotates within the housing member 120 based on one or more of a number of factors, including but not limited to gravity, an amount of condensation that accumulates within the base member 110, the positioning of slotted features 116 in the base member 110 relative to drainage apertures 122 in the housing member 120, the number of slotted features 116 in the base member 110, and the number of drainage apertures 122 in the housing member 120.

If the base member 110 is not properly aligned with the housing member 120, then the base member 110 continues to rotate until the alignment of the slotted features 116 relative to the drainage apertures 122 allows for proper drainage of the condensation. In certain exemplary embodiments, in addition or in the alternative, the housing member 120 rotates to allow for proper drainage of the condensation from the drain hub 100.

In step 510, the condensation is drained through a number of apertures in the base member 110 and the housing member 120. Specifically, the condensation is drained through the slotted features 116 in the base member 110 and the drainage apertures 122 in the housing member 120. As the condensation drains through the drainage apertures 122 in the housing member 120, the condensation is removed from the drain hub 100, and thus the enclosure. When step 510 is completed, the process continues to the END step.

In certain exemplary embodiments, the exemplary method 500 can be performed simultaneously on a different end (if there is more than one end) of the drain hub 100. In such a case, the other end could, simultaneously with the first end performing the method 500 described above, collect and remove condensation from a different enclosure that is coupled to the drain hub 100. For example, if the drain hub 100 has only two sides, then additional condensation can be received along the conductor on an opposite side of the damming device 400. In such a case, the opposite side may include the additional base 440. The opposite side of the drain hub 100 then would collect condensation, using the other side of the damming device 170, within the additional base member 440. Finally, the condensation drains through a number of apertures (slotted features 447) in the additional base member 440. In certain exemplary embodiments, the additional base member 440 may rotate to allow for easier drainage of the condensation.

Exemplary embodiments provide for a drain hub. Specifically, certain exemplary embodiments allow for the connection of condensation along a conductor from one or more enclosures and removing such condensation from the enclosure. In addition, the exemplary drain hub prevents condensation from traversing along a conductor through the drain hub to the other side of the drain hub. The drain hub can collect and remove condensation from a conductor on one side of the drain hub or from more multiple (two or more) sides of the drain hub. Exemplary embodiments may be used with a variety of sizes, quantities, and/or shapes of conductor.

In addition, exemplary embodiments provide for circuit integrity to the corresponding electric circuit that uses the conductor. Exemplary embodiments save time, material, and money in installing and maintaining an electrical system. Specifically, using exemplary drain hubs described herein reduces or eliminates the concern of moisture-related electrical problems associated with junction boxes, conduit, terminal blocks, fuse blocks, conductors, and a number of other components and enclosures. In addition, the use of exemplary drain hubs can provide one or more of a number of electrical and/or mechanical benefits relative to the conductor. Such benefits can include, but are not limited to, ease of installation, ease of maintenance, increased lifespan of electrical components associated with a conductor, and replacing a blown fuse that results from an overcurrent and/or overtemperature condition.

Although embodiments described herein are made with reference to exemplary embodiments, it should be appreciated by those skilled in the art that various modifications are well within the scope and spirit of this disclosure. Those skilled in the art will appreciate that the exemplary embodiments described herein are not limited to any specifically discussed application and that the embodiments described herein are illustrative and not restrictive. From the description of the exemplary embodiments, equivalents of the elements shown therein will suggest themselves to those skilled in the art, and ways of constructing other embodiments using the present disclosure will suggest themselves to practitioners of the art. Therefore, the scope of the exemplary embodiments is not limited herein.

What is claimed is:

1. A drain hub, comprising:
  a housing having a housing cavity traversing its length and comprising:
    a top cylindrical bore having a first inner perimeter;
    a middle cylindrical bore comprising at least one wall and a plurality of drainage apertures that traverse the at least one wall, wherein the middle cylindrical bore has a second inner perimeter, wherein the first inner perimeter is greater than the second inner perimeter; and
    a bottom cylindrical bore having a third inner perimeter, wherein the second inner perimeter is greater than the third inner perimeter;
  a base disposed within the housing cavity and having a base cavity traversing its length, wherein the base comprises:
    a top base portion comprising a plurality of slotted features disposed along a top base end and having a first outer perimeter, wherein the first outer perimeter is less than the second inner perimeter of the middle cylindrical bore and greater than the third inner perimeter of the bottom cylindrical bore; and
    a bottom base portion that extends beyond an aperture in the bottom cylindrical bore; and
  a damming device disposed within the housing cavity adjacent to the top base portion and the top cylindrical bore, wherein the damming device comprises an elastomeric material and at least one aperture that is configured to receive at least one conductor.

2. The drain hub of claim 1, further comprising:
  a filter sleeve fixedly coupled to a bottom portion of the damming device and comprising a filter sleeve wall having a length and a second outer perimeter,
  wherein the second outer perimeter is less than a fourth inner perimeter of the base,
  wherein the filter sleeve wall comprises a permeable material.

3. The drain hub of claim 1, further comprising:
  an inverted nut removably coupled to the top housing portion and disposed above the damming device, wherein the inverted nut has an inverted nut cavity that traverses its length.

4. The drain hub of claim 3, further comprising:
  an insulating member disposed between the inverted nut and the top cylindrical bore.

5. The drain hub of claim 4, wherein the top cylindrical bore comprises a receiving feature disposed along a top housing end, wherein the receiving feature receives the insulating member.

6. The drain hub of claim 3, wherein the inverted nut is mechanically coupled to one side of an enclosure surface, wherein the top cylindrical bore is mechanically coupled to an opposite side of the enclosure surface, and wherein the inverted nut traverses an aperture in the enclosure surface.

7. The drain hub of claim 3, wherein the inverted nut has threads disposed on an outer surface that mate with complementary threads disposed on an inner surface of the top cylindrical bore, wherein the inverted nut threadably couples to the top cylindrical bore.

8. The drain hub of claim 3, wherein the at least one conductor further traverses the inverted nut cavity and the base cavity.

9. The drain hub of claim 1, further comprising:
  an additional base mechanically coupled to the housing and comprising an additional plurality of slotted features that are disposed along a top surface of the inverted nut, wherein the additional base has a second outer perimeter that is slightly less than a fifth inner perimeter of the inverted nut.

10. The drain hub of claim 9, wherein the additional base has an inner additional base shape having an inner additional base perimeter, wherein the additional base receives a conduit having the inner additional base shape and a conduit perimeter into an additional base cavity, wherein the conduit perimeter is slightly less than the inner additional base perimeter.

11. The drain hub of claim 1, wherein at least one of the plurality of slotted features of the base rotatably aligns with at least one of the plurality of drainage apertures of the housing.

12. The drain hub of claim 1, wherein the bottom base portion and the top base portion form an inner base shape having an inner base perimeter, wherein the base receives a conduit having the inner base shape and a conduit perimeter into the base cavity, wherein the conduit perimeter is slightly less than the inner base perimeter.

13. The drain hub of claim 1, wherein the damming device further comprises a first outer perimeter that is less than the first inner perimeter and greater than the second inner perimeter of the housing.

14. The drain hub of claim 2, wherein the filter sleeve is disposed within the base cavity.

15. The drain hub of claim 1, wherein the damming device prevents fluid from flowing from one side of the damming device to an opposite side of the damming device within the housing cavity.

16. The drain hub of claim 15, wherein the fluid flowing through at least one of the plurality of slotted features disposed on the top base portion and at least one of the plurality of drainage apertures disposed on the middle housing portion.

17. An enclosure system, comprising:
   an enclosure comprising a hole;
   a drain hub disposed within the hole, comprising:
      a housing having a housing cavity traversing its length and comprising:
         a top cylindrical bore having a first inner perimeter;
         a middle cylindrical bore comprising at least one wall and a plurality of drainage apertures that traverse the at least one wall, wherein the middle cylindrical bore has a second inner perimeter, wherein the first inner perimeter is greater than the second inner perimeter; and
         a bottom cylindrical bore having a third inner perimeter, wherein the second inner perimeter is greater than the third inner perimeter;
      a base disposed within the housing cavity and having a base cavity traversing its length, wherein the base comprises:
         a top base portion comprising a plurality of slotted features disposed along a top base end and having a first outer perimeter, wherein the first outer perimeter is less than the second inner perimeter of the middle cylindrical bore and greater than the third inner perimeter of the bottom cylindrical bore; and
         a bottom base portion that extends beyond an aperture in the bottom cylindrical bore;
      a damming device disposed within the housing cavity adjacent to the top base portion and the top cylindrical bore, wherein the damming device comprises an elastomeric material and at least one aperture that is configured to receive at least one conductor; and
      an inverted nut coupled to the top cylindrical bore and disposed above the damming device, wherein the inverted nut has an inverted nut cavity that traverses its length, wherein the enclosure is disposed between the inverted nut and the housing; and
   a conduit disposed within the base cavity and mechanically coupled to the base.

18. The enclosure system of claim 17, further comprising:
   at least one conductor disposed within the base cavity and the inverted nut cavity, wherein the at least one conductor traverses the at least one aperture of the damming device.

19. The enclosure system of claim 18, wherein the damming device prevents fluid on the at least one conductor from flowing from one side of the damming device to an opposite side of the damming device within the housing cavity.

20. The enclosure system of claim 19, wherein the fluid on the at least one conductor drains through at least one of the plurality of slotted features disposed on the top base portion and at least one of the plurality of drainage apertures disposed on the middle housing portion, wherein the at least one of the plurality of slotted features and the at least one of the plurality of drainage apertures are located outside the enclosure.

* * * * *